(12) United States Patent
Bidet

(10) Patent No.: US 6,880,600 B1
(45) Date of Patent: Apr. 19, 2005

(54) TIRE INCLUDING A CARCASS PLY, AN INNER ELASTOMERIC LAYER AND AN ELASTOMERIC REINFORCEMENT LAYER BETWEEN THE PLY AND THE INNER LAYER

(75) Inventor: Bernard Bidet, Riom (FR)

(73) Assignee: Michelin Recherche et Technique, S.A., Granges-Paccot (CH)

( * ) Notice: Subject to any disclaimer, the term of this patent is extended or adjusted under 35 U.S.C. 154(b) by 322 days.

(21) Appl. No.: 09/630,915

(22) Filed: Aug. 2, 2000

(30) Foreign Application Priority Data

Aug. 2, 1999 (FR) .......................................... 99 10110

(51) Int. Cl.⁷ .............................. B60C 5/14; B60C 9/00
(52) U.S. Cl. ....................... 152/510; 152/549; 152/565; 156/110.1
(58) Field of Search ................................ 152/510, 565, 152/511

(56) References Cited

U.S. PATENT DOCUMENTS

| | | | | |
|---|---|---|---|---|
| 3,563,928 A | * | 2/1971 | King .......................... | 524/271 |
| 3,639,308 A | * | 2/1972 | Topcik ........................ | 152/510 |
| 3,884,993 A | * | 5/1975 | Gros .......................... | 525/211 |
| 4,500,672 A | * | 2/1985 | Suzuki et al. ................. | 524/496 |
| 5,280,817 A | * | 1/1994 | Liu et al. ..................... | 152/454 |
| 5,491,196 A | * | 2/1996 | Beers et al. .................. | 525/237 |
| 5,504,159 A | * | 4/1996 | Sturm et al. .................. | 525/164 |
| 5,807,918 A | * | 9/1998 | Carter ......................... | 524/495 |
| 6,156,822 A | * | 12/2000 | Materne et al. .............. | 152/151 |

FOREIGN PATENT DOCUMENTS

| | | | |
|---|---|---|---|
| FR | 2536017 | | 5/1984 |
| FR | 2606020 | | 5/1988 |
| GB | 2198138 | * | 6/1988 |
| JP | 55-36266 | * | 3/1980 |
| JP | 7186609 | | 7/1995 |
| JP | 07237405 | * | 9/1995 |
| JP | 10297209 | * | 11/1998 |

OTHER PUBLICATIONS

Derwent Abstract of JP 55 36266 (Mayama), published Mar. 13, 1980.
Kokai Tokkyo Koho Abstract, reference: 93: 27582y, of JP 55 36266 (Mayama), published Mar. 13, 1980.

* cited by examiner

Primary Examiner—Blaine Copenheaver
Assistant Examiner—Justin Fischer
(74) Attorney, Agent, or Firm—Fitzpatrick, Cella, Harper & Scinto

(57) ABSTRACT

The invention provides a tire having a carcass ply, an inner elastomeric layer for sealing against inflation gases and an intermediate elastomeric layer between the carcass ply and inner layer, in which the intermediate reinforcement layer is formed from a rubber composition comprising:

(i) a natural or synthetic polyisoprene having a majority of chains with cis-1,4 bonds and a copolymer prepared in solution of one or more conjugated diene monomers and one or more vinyl aromatic monomers, said copolymer simultaneously satisfying the following relationships:

$$D \geq 60 - 1.75 \cdot VA \quad (1)$$

$$D \leq 116 - 1.64 \cdot VA \quad (2)$$

$$D > 10 \quad (3)$$

$$VA > 10, \quad (4)$$

wherein D is the amount of diene chains having a 1, 2 bond content (in %) and VA is the amount of vinyl aromatic chains (in %), and (ii) carbon black, in an amount of 25 to 85 parts by weight per hundred parts of said elastomer (phr), wherein said carbon black has values of DBP oil absorption (in ml/100 g) and of BET specific surface area (in m²/g) which fulfil the following relationship:

$$DBP \leq -0.88 \cdot BET + 190.$$

15 Claims, No Drawings

TIRE INCLUDING A CARCASS PLY, AN INNER ELASTOMERIC LAYER AND AN ELASTOMERIC REINFORCEMENT LAYER BETWEEN THE PLY AND THE INNER LAYER

BACKGROUND OF THE INVENTION

The present invention relates to a tire comprising a carcass ply, an inner elastomeric layer for sealing against the inflation gases and an elastomeric reinforcement layer between said ply and said inner layer. The invention is particularly applicable to tires of radial structure for motor vehicles bearing heavy loads, in particular for heavy vehicles and construction vehicles.

It is known to the person skilled in the art that a radial carcass tire for a motor vehicle bearing heavy loads has a framework comprising the following elements:

(i) one or more bead wires in the bottom zone of the sidewalls, (ii) a carcass reinforcement extending from one bead wire to the other and comprising a carcass ply radially and axially to the outside of the inner layer, said ply being formed of metal cords coated in an elastomeric layer, and (iii) a crown reinforcement, radially located to the outside of the carcass reinforcement, which comprises at least two crown plies.

The skeleton is consolidated and protected by elastomeric layers arranged on either side of the carcass ply, as follows.

Axially to the outside of the carcass ply, the sidewalls function to reinforce the carcass reinforcement and protect against mechanical and/or chemical attack to which the carcass ply is subjected.

Axially and radially to the inside of the carcass ply is an inner elastomeric layer which defines the radially inner face of the tire. The inner layer surrounds and circumscribes the inner space of the tire into which inflation gases are administered. This inner layer is made sufficiently airtight with respect to the inflation gases to maintain the inflation pressure within the tire during travel. The inner layer protects the carcass ply from the migration of the inflation gases, in particular oxygen, which are under high pressure. The inner elastomeric layer is generally formed from a composition based on halogenated butyl rubber.

An elastomeric reinforcement layer between said carcass ply and said inner layer is provided to reinforce the inner layer, as well as the carcass ply. This intermediate reinforcement layer provides mechanical connection of the carcass ply to the inner layer, and is also intended to delocalize the forces to which the carcass reinforcement is subjected during use of the tire (i.e., travel).

The reinforcement layer also protects the carcass ply from attack, such as the diffusion of oxygen, so that the ply retains its original characteristics for as long as possible. Thus, the intermediate reinforcement layer increases the life of the tire and the number of possible recappings thereof.

It is essential that the intermediate reinforcement layer have satisfactory compatibility and, especially, mechanical connection, with both the inner layer and the carcass ply in order to avoid separation during travel.

Preferably, the composition for the intermediate reinforcement layer is close to that used for the carcass ply, so that the constituents that promote adhesion between the elastomer and metal cords of the ply do not migrate towards the neighbouring layers and that constituents of the neighbouring layers which might adversely affect adhesion do not migrate in the opposite direction towards the carcass ply.

When the compositions of the intermediate layer and the carcass ply are very close, e.g., have the same elastomeric base, in the absence of a concentration gradient and a difference in solubility, there is no possibility of migration of the constituents.

It is also known that reducing the temperature of the inner layer during travel provides for increased life, by slowing down thermal and thermo-oxidizing aging.

There are various ways of effecting this reduction in temperature during travel, including using compositions of low hysteresis or reducing the thickness of the tire to promote dissipation of the heat towards the outer surface, with the advantage of reducing the suspended mass of the vehicle.

However, in order for the intermediate reinforcement layer to be an effective reinforcement for the carcass ply and to provide a barrier to oxygen with respect to the carcass ply, the layer must have a sufficiently great thickness, which also promotes the consumption of oxygen which has migrated across the inner layer.

On the other hand, if an increase in the temperature of the internal layer during travel benefits this oxygen-barrier effect, it also benefits the migration of oxygen. Hence, the final result is virtually unpredictable to the person skilled in the art.

In summary, the intermediate reinforcement layer must provide the following:

withstand, without damage, the high elongations that take place in the uncured state during the shaping phase of the manufacture of the tire, which implies high cohesion in the uncured state;

contribute to the reinforcement of the carcass ply, both in the uncured and in the cured state, by delocalizing part of the mechanical forces to which the ply is subjected during travel;

provide mechanical connection between the carcass ply, generally based on natural rubber and the inner layer, generally based on a halogenated butyl rubber;

not adversely affect the composition of the carcass ply before, during or after vulcanization, by a composition insufficiently close to that of said ply; and be a barrier to the migration of oxygen which has passed through the inner layer.

There are various ways of limiting the migration of oxygen through the intermediate reinforcement layer including:

a) increasing the thickness of the layer, which has the disadvantages of increasing the weight and cost of the tire and increasing the heating of the internal layer during travel, b) reducing the partial oxygen pressure in the inner space of the tire by inflating it with an air mix that is low in oxygen, as described in patent specification JP-A-10 258 604 or, alternatively, by providing the wheel with a means for absorbing oxygen, as described in patent specification JP-A-08 230 421, c) fixing the oxygen in the intermediate reinforcement layer by reducing the amount of antioxidant which, however, does not contribute to a long life of the carcass reinforcement, d) using, as indicated in ENCYCLOPEDIA KIRK-OTHMER, third edition, Wiley, volume 3, page 483 in the chapter "Barrier Polymers", a polymer less permeable to oxygen that has been made so by increasing its glass transition temperature Tg, its polarity, its crystallinity, its chain rigidity, its degree of compactness (order, symmetry), or alternatively by using in the highest amount possible a coarse and/or lamellar filler which interacts satisfactorily with the elastomer (e.g. via a filler/elastomer coupling agent). However, this amount of filler is limited by the requirements of working and of fatigue resistance under repeated stresses.

In order to achieve an improvement in the life of tires bearing heavy loads, the person skilled in the art can alter numerous physical, chemical and physico-chemical parameters, while taking into account the requirements of rolling resistance, weight and cost of the tires. These improvements can be achieved by carrying out tests of tires travelling on a vehicle, but such tests are costly. Moreover, the results of the tests are not readily predictable because of the number of parameters to be considered with the interactions thereof being numerous and not well defined.

SUMMARY OF THE INVENTION

The object of the present invention is to improve the life of tires bearing heavy loads. After numerous tests, the inventor has discovered an improved composition for the intermediate reinforcement layer of a carcass ply tire that makes it possible to achieve this object.

The composition comprises:

(a) an elastomer comprising a natural or synthetic polyisoprene having a majority of chains with cis-1,4 bonds and a copolymer composed of one or more conjugated diene polymers and one or more vinyl aromatic polymers, said copolymer simultaneously satisfying the following relationships:

$D \geq 66 - 1.58.VA$                 (i)

$D \leq 124 - 1.71.VA$               (ii)

$D > 10$                            (iii)

$VA > 10$                       (iv)

wherein D is the amount of diene chains having a 1,2 bond content (in %) and VA is the amount of vinyl aromatic chains (in %) and (b) carbon black in an amount of 25 to 85 parts by weight per hundred parts of said elastomer (phr), wherein said carbon black has values of DBP (dibutyl phthalate) oil absorption (in ml/100 g) and of BET specific surface area (in m$^2$/g) which fulfil the following relationship:

$DBP \leq -0.88.BET + 190.$

The DBP oil absorption of the carbon black is measured using dibutyl phthalate oil following known procedures, e.g., EPA 0,157,703. The BET specific surface area is measured in accordance with the method of BRUNAUER, EMMET and TELLER described in "The Journal of the American Chemical Society", vol. 60, page 309, February 1938, corresponding to Standard NFT 45007 of November 1987.

Preferably, the elastomer comprises polyisoprene having a greater than 80% cis-1,4 bond content and a copolymer prepared in solution from conjugated diene and vinyl aromatic monomers, wherein the conjugated diene monomers are selected from the group consisting of butadiene, isoprene and mixtures thereof, and the vinyl aromatic monomers are selected from the group consisting of styrene, a-methylstyrene and mixtures thereof, said copolymer simultaneously satisfying the following relationships:

$D \geq 66 - 1.58.VA$                 (i)

$D \leq 124 - 1.71.VA$               (ii)

$D > 10$                            (iii)

$VA > 10$                       (iv)

wherein D is the amount of diene chains having a 1,2 bond content (in %) and VA is the amount of vinyl aromatic chains (in %), and the carbon black has values of DBP oil absorption (in ml/100 g) and of BET specific surface area (in m$^2$/g) that fulfil the following relationship:

$DBP \leq -0.88.BET + 185$

DETAILED DESCRIPTION OF THE INVENTION

The present invention provides an improved composition for use in the intermediate reinforcement layer of a carcass ply tire that makes possible the improved life span of such tires bearing heavy loads.

The intermediate reinforcement layer composition comprises:

(a) an elastomer comprising a natural or synthetic polyisoprene having a majority of chains with cis-1,4 bonds and a copolymer composed of one or more conjugated diene polymers and one or more vinyl aromatic polymers, said copolymer simultaneously satisfying the following relationships:

$D \geq 66 - 1.58.VA$                 (i)

$D \leq 124 - 1.71.VA$               (ii)

$D > 10$                            (iii)

$VA > 10$                       (iv)

wherein D is the amount of diene chains having a 1,2 bond content (in %) and VA is the amount of vinyl aromatic chains (in %) and (b) carbon black in an amount of 25 to 85 parts by weight per hundred parts of said elastomer (phr), wherein said carbon black has values of DBP (dibutyl phthalate) oil absorption (in m/100 g) and of BET specific surface area (in m$^2$/g) which fulfil the following relationship:

$DBP \leq -0.88.BET + 190.$

The DBP oil absorption of the carbon black is measured using dibutyl phthalate oil following known procedures, e.g., EPA 0.157,703. The BET specific surface area is measured in accordance with the method of BRUNAUER, EMMET and TELLER described in "The Journal of the American Chemical Society", vol. 60, page 309, February 1938, corresponding to Standard NFT 45007 of November 1987.

Preferably, the elastomer comprises polyisoprene having a greater than 80% cis-1,4 bond content and a copolymer prepared in solution from conjugated diene and vinyl aromatic monomers, wherein the conjugated diene monomers are selected from the group consisting of butadiene, isoprene and mixtures thereof, and the vinyl aromatic monomers are selected from the group consisting of styrene, α-methylstyrene and mixtures thereof, said copolymer simultaneously satisfying the following relationships:

$$D \geq 66 - 1.58 \cdot VA \quad \text{(i)}$$

$$D \leq 124 - 1.71 \cdot VA \quad \text{(ii)}$$

$$D > 10 \quad \text{(iii)}$$

$$VA > 10 \quad \text{(iv)}$$

wherein D is the amount of diene chains having 1, 2 bond content (in %) and VA is the amount of vinyl aromatic chains (in %), and the carbon black has values of DBP oil absorption (in ml/100 g) and of BET specific surface area (in m$^2$/g) that fulfil the following relationship:

$$DBP \leq -0.88 \cdot BET + 185.$$

In particular, the elastomer comprises polyisoprene in an amount of 10 to 90 parts by weight per one hundred parts of the elastomer (phr) and the copolymer in an amount of 90 to 10 phr. More preferably, the elastomer comprises polyisoprene in an amount of 15 to 85 phr and the copolymer in an amount of 85 to 15 phr.

The polyisoprene and/or the copolymer may be coupled and/or starred or, alternatively, functionalized with a coupling and/or starring or functionalizing agent.

The composition may also comprise at least one white reinforcing filler in an amount of less than 50 phr. The white reinforcing filler is a "white" filler (i.e., inorganic, in particular, a mineral), sometimes referred to as a "clear" filler, that is able to reinforce a rubber (elastomer) composition for use in tires, without additional components, except an intermediate coupling system. In other words, the white reinforcing filler can replace a conventional tire grade carbon black in reinforcing a tire rubber composition. In the present invention, the white reinforcing filler comprises silica and/or alumina, having surface SiOH and/or AlOH functions, respectively.

Alternatively, the intermediate reinforcement layer composition may comprise a modified carbon black having SiOH and/or AlOH functions at the surface, in an amount of less than 50 phr, as a reinforcing filler.

The silica and/or alumina fillers preferably have a BET specific surface area of 30 to 240 m$^2$/g, and are selected from the group consisting of precipitated silica, pyrogenic silica, alumina and a silico-aluminate.

The modified carbon black may be modified either during synthesis by addition of a compound of silicon and/or aluminium to the feed oil of the oven or after synthesis by addition of an acid to an aqueous suspension of carbon black in an alkali metal silicate and/or aluminate solution, so as to cover the surface of the carbon black, at least in part, with SiOH and/or AlOH functions.

Non-limiting examples of modified carbon black having SiOH and/or AlOH functions at the surface include the fillers of the CSDPF type (carbon silica dual phase filler) described in Conference No. 24 of the ACS Meeting, Rubber Division, Anaheim, Calif., 6–9 May 1997 and those disclosed in patent specifications EP-A-799 854 and WO-A-96/037447.

With the aim of improving the working and/or lowering the cost of the intermediate reinforcement layer composition according to the invention, and without fundamentally modifying its hysteresis and cohesion characteristics, the white reinforcing filler or the modified carbon black described above may be partially replaced with a filler having a lesser degree of reinforcement, such as a crushed or precipitated calcium carbonate or a kaolin, provided that x phr of reinforcing filler is replaced by x+5 phr of less-reinforcing filler, wherein x is less than 15 phr.

Additional components of the intermediate reinforcing layer composition of the invention can include one or more of the following:

(1) 1 to 5 phr of a paraphenylene diamine antioxidant, for example N-(1, 3-dimethyl butyl)-N'-phenyl-p-phenylene diamine, (2) 0.03 to 3 phr of a metal salt, which is selected from among organic salts, such as those described in patent specification FR-A-2 770 848 and inorganic salts, e.g., hydroxides of cobalt, nickel and iron, (3) stearic acid in an amount of less than 2 phr, (4) zinc oxide in an amount greater than 2 phr, and (5) 1 to 6 phr of sulphur.

Preferably the intermediate reinforcement layer composed of the compositions of the invention has a thickness of 1 to 4 mm.

The intermediate reinforcement layer compositions according to the invention are capable of cross-linking under the action of sulphur, peroxides, or bismaleimides with or without sulphur. They may also contain various other constituents conventionally used in rubber mixes, such as plasticizers, pigments, antioxidants and cross-linking accelerators, such as benzothiazol derivatives and diphenylguanidine.

The compositions according to the invention may be prepared in one or more stages using known thermomechanical working processes for the constituents. For example, they may be obtained by thermomechanical working in a single stage lasting from 3 to 7 minutes in an internal mixer with a rotation speed of the blades of 50 rpm, followed by a finishing stage carried out at about 80° C.

The compositions may also be prepared by thermomechanical working carried out in two stages in an internal mixer, lasting for 3 to 5 minutes and 2 to 4 minutes respectively, followed by a finishing stage carried out at about 80° C. In the case of sulphur-cross-linked compositions, the sulphur and the vulcanization accelerators are incorporated during the finishing stage.

The aforementioned characteristics of the present invention, as well as others, will be better understood from the instant detailed description which includes the following non-limiting examples.

In the following examples, which may or may not be in accordance with the invention, the properties of the compositions are evaluated as follows:

Mooney Viscosity

Mooney viscosity ML (1+4) is measured in accordance with Standard ASTM D-1646.

Rheometry

Rheometry measurements are performed by measuring torque on a rheometer sold under the name "Monsanto", Model 100S. They are intended to monitor the vulcanization process by determining the time To (in minutes) which corresponds to the vulcanization delay and the time T99 (in minutes) which corresponds to 99% of the maximum torque measured.

Elongation Measurements

The moduli of elongation are measured at 10% (ME 10) and at 100% (ME100) in accordance with Standard ISO 37-1977.

Scott Break Indices

These indices are measured at 23° C. or 100° C. The breaking stress (BS) is determined in MPa, and the elongation at break (EB) in %.

Tearability Indices

These indices are measured at 100° C. The rupture force (TBS) is determined in MPa and the elongation at break (TEB) in %, on a test piece of dimensions 10×105×2.5 mm notched at the centre over a depth of 5 mm.

Hysteresis Losses

Hysteresis losses (HL) or hysteresis, measured by rebound at 60° C. in accordance with standard ISO RI 7667, are expressed in %.

Life of a Carcass Reinforcement

In a test of travel on a test drum, the mileage covered by the tire being tested and by a control tire are noted as soon as damage is detected. This life is expressed as a relative value, with a base of 100 corresponding to a control tire.

On-Road Travel Test

In this real on-road travel test, the breaking force of the cords of the carcass ply of the tire being tested and of a control tire having covered the same number of kilometres on the same vehicle are measured, after decortication and without waiting for damage to appear on the tire, in the zones subjected to the highest stresses, i.e., the bottom zone and at the level of the shoulder.

The result of this test is expressed as a relative value of the breaking force, with a base 100 corresponding to the control tire.

EXAMPLE 1

The object of this example is to compare the performance obtained on tires having intermediate reinforcement layer compositions in accordance with the invention with a control intermediate reinforcement layer composition which represents the known prior art.

The compositions, which in this example are all sulphur-vulcanizable, are set forth in Table 1 below. They are:

Test 1, a control composition based on natural rubber,

Test 2, a composition not in accordance with the invention, based on a styrene and butadiene copolymer prepared in solution (abbreviated: SBR A solution), and Tests 3, 4, 5 and 6, compositions according to the invention based on an elastomer formed of blends of natural rubber and of the above SBR A (abbreviated: NR-SBR A solution), in which the nature of the extending oil is varied.

In this example:

The natural rubber is peptized natural rubber having a Mooney ML (1+4) value at 100° C. of 60.

The SBR A solution polymer has a Mooney value of 54, a proportion of polybutadiene having a 1,2 bond content of 24% and a proportion of polystyrene chains of 40%.

N-(1,3-dimethylbutyl)-N'-phenyl-p-phenylene diamine is used as antioxidant.

A cobalt resinate is used as metal salt, in an amount expressed in phr of cobalt (parts by weight per one hundred parts elastomer).

The compositions are prepared by addition of all the constituents, except for the soluble sulphur and the vulcanization accelerators, by means of thermomechanical working in a single stage lasting about 4 minutes, with a rotation speed of the blades of 50 rpm, until a dropping temperature of 170° C. is reached, followed by a finishing stage carried out at 80° C., during which the sulphur and the vulcanization accelerators are incorporated.

TABLE 1

| Composition | Test 1 control | Test 2 | Test 3 | Test 4 | Test 5 | Test 6 |
|---|---|---|---|---|---|---|
| Natural rubber | 100 | | 50 | 20 | 20 | 20 |
| SBR A | | 100 | 50 | 80 | 80 | 80 |
| N326 | 50 | | | | | |
| N772 | | 65 | 65 | 65 | 65 | 65 |
| ZnO | 6 | 6 | 6 | 6 | 6 | 6 |
| Stearic acid | 0.5 | 0.5 | 0.5 | 0.5 | 0.5 | 0.5 |
| Antioxidant | 2 | 2 | 2 | 2 | 2 | 2 |
| Aromatic oil | | 18.75 | 18.75 | 18.75 | 10 | |
| Paraffin oil | | | | | | 10 |
| % Co | 0.2 | 0.2 | 0.2 | 0.2 | 0.2 | 0.2 |

TABLE 1-continued

| Composition | Test 1 control | Test 2 | Test 3 | Test 4 | Test 5 | Test 6 |
|---|---|---|---|---|---|---|
| soluble sulphur | 5 | 5 | 5 | 5 | 5 | 5 |
| TBBS* | 0.6 | 0.6 | 0.6 | 0.6 | 0.6 | 0.6 |

*TBBS is t-butylbenzothiazol sulphenamide.

The vulcanization is carried out at 140° C. for a time sufficient to achieve 99% of the value of the maximum torque, measured on a rheometer.

The properties of these six compositions are compared. The results obtained are set forth in Table 2 below.

TABLE 2

| | Test 1 control | Test 2 | Test 3 | Test 4 | Test 5 | Test 6 |
|---|---|---|---|---|---|---|
| Mooney ML (1 + 4) | 74 | 67 | 70 | 67 | 70 | 70 |
| To | 5 | 17 | 10 | 13 | 15 | 15 |
| T99 | 47 | 164 | 125 | 150 | 150 | 140 |
| ME10 | 5.6 | 3.7 | 4.5 | 4.3 | 4.6 | 4.2 |
| ME100 | 2.6 | 2.0 | 2.5 | 2.4 | 2.6 | 2.6 |
| HL at 60° Breakage at 100° C. | 18 | 18 | 17.5 | 18 | 16 | 15 |
| BS in MPa | 16 | 17 | 18 | 17 | 15 | 15 |
| EB in % | 510 | 510 | 550 | 480 | 300 | 340 |
| Tearability | | | | | | |
| TBS in MPa | 22 | 24 | 25 | 22 | 32 | 26 |
| TEB in % Travel on drum | 94 | 132 | 135 | 110 | 133 | 116 |
| Life of tire On-road travel | 100 | (*) | 120 | 160 | 190 | 160 |
| BS of the bottom-zone cords | 100 | (*) | 105 | 115 | 190 | 115 |
| BS of the shoulder-zone cords | 100 | (*) | 105 | 110 | 120 | 110 |

(*) The tires having a composition of the reinforcement layer constituted by pure SBR A solution could not be tested during travel, as a result of the defects exhibited by the carcass ply in this case.

Table 2 shows that the compositions according to the invention (Tests 3, 4, 5 and 6) i.e., comprising blends of natural rubber with solution SBR A, provide significantly improved performance during travel compared with the control composition (Test 1).

EXAMPLE 2

The object of this example is to compare the performance of tires comprising intermediate reinforcement layer compositions which are or are not in accordance with the invention with those obtained for a control composition which represents the known prior art.

These compositions, which in this example are all sulphur-vulcanizable, are set forth in Table 3 below. They are:

Test 7, a control composition based on natural rubber,

Test 8, a composition which is not in accordance with the invention because of the nature of the carbon black which it comprises, Tests 9 and 10, compositions according to the invention.

In this example:

The copolymer is an SBR B solution polymer having a Mooney value ML (1+4) at 100° of 54, a proportion of polybutadiene having a 1,2 bond content of 24% and a proportion of polystyrene of 26%.

An iron salt based on iron hydroxide is used, in an amount expressed in phr of metallic iron.

The compositions are obtained by addition of all the constituents, except for the soluble sulphur and the vulcanization accelerators, as in Example 1. The vulcanization is carried out at 140° C. for a time sufficient to achieve 99% of the value of the maximum torque, measured on a rheometer.

The properties of the four compositions tested are compared. The results are set forth in Table 4 below.

It will be noted that for the control (Test 7) and the composition not in accordance with the invention (Test 8), the performances obtained are poorer than those of the compositions of the invention (Tests 9 and 10).

TABLE 3

| Composition | Test 7 control | Test 8 | Test 9 | Test 10 |
|---|---|---|---|---|
| Natural rubber | 100 | 70 | 20 | 20 |
| SBR A | | | 80 | 80 |
| SBR B | | 30 | | |
| N326 | | | | 50 |
| N375 | | 45 | | |
| N772 | 45 | | 45 | |
| ZnO | 7.5 | 5 | 7.5 | 7.5 |
| Stearic acid | 1.0 | 0.5 | 1.0 | 1.0 |
| Antioxidant | 2 | 2 | 2 | 2 |
| Co metal (phr) | | 0.2 | | 0.2 |
| Fe metal | 0.02 | | 0.02 | |
| soluble sulphur | 4.5 | 4.5 | 4.5 | 4.5 |
| TBBS | 0.7 | 0.6 | 0.7 | 0.7 |

TABLE 4

| Composition: | Test 7 control | Test 8 | Test 9 | Test 10 |
|---|---|---|---|---|
| Mooney ML (1 + 4) | 65 | 75 | 70 | 67 |
| To | 6 | 5 | 10 | 6 |
| T99 | 29 | 51 | 125 | 55 |
| ME10 | 3.5 | 5.6 | 4.5 | 5.5 |
| ME100 | 2.1 | 2.8 | 2.5 | 2.7 |
| HL at 60° | 5 | 20 | 17.5 | 19 |
| Breakage at 100° C. | | | | |
| BS in MPa | 17 | 12.4 | 18 | 14 |
| EB in % | 550 | 357 | 550 | 380 |
| Tearability | | | | |
| TBS in MPa | 17 | 17 | 25 | 22 |
| TEB in % | 83 | 82 | 135 | 90 |
| Travel on drum | | | | |
| Life of tire | 100 | 85 | 130 | 110 |
| On-road travel | | | | |
| BS of the bottom-zone cords | 100 | 95 | 110 | 102 |
| BS of the shoulder-zone cords | 100 | 95 | 110 | 105 |

In summary, the life of a tire comprising an intermediate reinforcement layer composition according to the invention, as determined by the appearance of significant damage, is greater than that of tires comprising known reinforcing layer compositions by at least 20%, and sometimes by more than 50%.

I claim:

1. A tire for motor vehicles bearing heavy loads comprising:
   (a) a carcass ply based on metal cords and an elastomeric carcass layer coating said cords,
   (b) an inner elastomeric layer which defines the radially inner face of said tire, thereby circumscribing the inner space of the tire, and which protects the carcass ply from diffusion of air coming from the inner space of the tire, and
   (c) an intermediate reinforcement layer located between said carcass ply and said inner layer, said intermediate reinforcement layer being formed from a composition comprising:
   (i) a natural or synthetic polyisoprene having a majority of chains with cis-1,4 bonds and a solution copolymer of one or more conjugated diene monomers and one or more vinyl aromatic monomers, wherein said copolymer is a solution SBR copolymer in an amount that is at least 50 phr and said solution SBR copolymer simultaneously satisfies the following relationships:

$$D \geq 60 - 1.75 \cdot VA \quad (1)$$

$$D \leq 116 - 1.64 \cdot VA \quad (2)$$

$$D > 10 \quad (3)$$

$$VA > 10, \quad (4)$$

wherein D is the amount of diene chains having a 1, 2 bond content (in %) and VA is the amount of vinyl aromatic chains (in %), and
   (ii) carbon black, in an amount of 25 to 85 parts by weight per hundred parts of said elastomer (phr),
   wherein said carbon black has values of DBP oil absorption (in ml/100 g) and of BET specific surface area (in m$^2$/g) which fulfil the following relationship:

$$DBP \leq -0.88 \cdot BET + 190.$$

2. The tire according to claim 1, wherein the composition comprises
   (a) polyisoprene having a greater than 80% cis-1,4 bond content, wherein said solution SBR copolymer satisfies the following relationships:

$$D \geq 66 - 1.58 \cdot VA \quad (i)$$

$$D \leq 124 - 1.71 \cdot VA \quad (ii)$$

$$D > 10 \quad (iii)$$

$$VA > 10 \quad (iv)$$

wherein D is the amount of diene chains having a 1, 2 content (in %) and VA is the amount of vinyl aromatic chains (in %), and
   (b) carbon black having values of DBP oil absorption (in ml/100 g) and of BET specific surface area (in m$^2$/g) that fulfil the following relationship:

$$DBP \leq -0.88 \cdot BET + 185.$$

3. The tire according to claim 1 or 2, wherein the composition comprises a white reinforcing filler in an amount of less than 50 phr, said filler comprising silica and/or alumina, having surface SiOH and/or AlOH functions, respectively.

4. The tire according to claim 3, wherein the white reinforcing filler has a BET specific surface area of between 30 m$^2$/g and 240 m$^2$/g.

5. The tire according to claim 1 or 2, wherein the composition comprises a modified carbon black having surface SiOH and/or AlOH functions, in an amount of less than 50 phr.

6. The tire according to claim 1 or 2 wherein the composition comprises a paraphenylene diamine antioxidant in an amount of 1 to 5 phr.

7. The tire according to claim 1 or 2 wherein the composition comprises a metal salt selected from the group consisting of organic salts and hydroxides of cobalt, nickel and iron, in an amount of 0.03 to 3 phr.

8. The tire according to claim 1 or 2 wherein the composition comprises stearic acid in an amount of less than 2 phr.

9. The tire according to claim 1 or 2 wherein the composition comprises zinc oxide in an amount of more than 2 phr.

10. The tire according to claim 1 or 2 wherein the composition comprises sulphur in an amount of 1 to 6 phr.

11. The tire according to claim 1 or 2, wherein the intermediate elastomeric reinforcement layer has a thickness of 1 to 4 mm.

12. The tire according to claim 1 or 2, wherein the composition further comprises kaolin.

13. A method for manufacturing a tire for motor vehicles bearing heavy loads comprising:

(a) a carcass ply based on metal cords and an elastomeric carcass layer coating said cords, (b) an inner elastomeric layer which defines a radially inner face of said tire, thereby circumscribing an inner space of the tire, and which protects the carcass ply from diffusion of air coming from the inner space of the tire, and (c) an intermediate reinforcement layer located between said carcass ply and said inner layer, wherein said intermediate layer is formed from a composition which is obtained by a process comprising the steps of:

(i) preparing in solution a copolymer of one or more conjugated diene monomers and one or more vinyl aromatic monomers, wherein said copolymer is a solution SBR copolymer in an amount that is at least 50 phr and said solution SBR copolymer simultaneously satisfies the following relationships:

$$D \geq 60 - 1.75 \cdot VA \qquad (1)$$

$$D \leq 116 - 1.64 \cdot VA \qquad (2)$$

$$D > 10 \qquad (3)$$

$$VA > 10, \qquad (4)$$

wherein D is the amount of diene chains having a 1,2 bond content (in %) and VA is the amount of vinyl aromatic chains (in %), (ii) blending the copolymer obtained in step (i) with a natural or synthetic polyisoprene having a majority of chains with cis-1,4 bonds to obtain an elastomeric blend, (iii) effecting a thermomechanical working of the elastomeric blend obtained in (ii) with the other constituents of said composition including carbon black in an amount of 25 to 85 parts by weight per hundred parts of said elastomeric blend (phr), said carbon black having values of DBP oil absorption (in ml/100 g) and of BET specific surface area (in m$^2$/g) which fulfil the following relationship:

$$DBP \leq -0.88 \cdot BET + 190.$$

14. The tire according to claim 1, wherein said polyisoprene has a cis-1,4 content greater than 80%.

15. The tire according to claim 1, wherein the amount of SBR copolymer is in the range from about 50 to about 80 phr.

* * * * *

UNITED STATES PATENT AND TRADEMARK OFFICE
CERTIFICATE OF CORRECTION

PATENT NO. : 6,880,600 B1
APPLICATION NO. : 09/630915
DATED : April 19, 2005
INVENTOR(S) : Bernard Bidet It is certified that error appears in the above-identified patent and that said Letters Patent is hereby corrected as shown below:

ON THE TITLE PAGE ITEM [56] REFERENCES CITED:

Foreign Patent Documents, "7186609    should read --7-186609
                                     07237405                      7-237405
                                     10297209"                 10-297209--; and
    Other Publications, "55 36266" (both occurrences) should read --55-36266--.

COLUMN 3:

Line 1, "filter" should read --filler--;
    Line 33, "$D \geq 66-1.58.VA$" should read --$D \geq 60-1.75.VA$--;
    Line 35, "$D \leq 124-1.71.VA$" should read --$D \leq 116-1.64.VA$--; and
    Line 66, "a-methylstyrene" should read --$\alpha$-methylstyrene--.

COLUMN 4:

Line 14, "$DBP \leq -0.88.BET+185$" should read --$DBP \leq -0.88.BET+185.$--;
    Line 33, "$D \geq 66-1.58.VA$" should read --$D \geq 60-1.75.VA$--;
    Line 34, "$D \leq 124-1.71.VA$" should read --$D \leq 116-1.64.VA$--; and
    Line 36, "$VA>10$" should read --$VA>10,$--.

UNITED STATES PATENT AND TRADEMARK OFFICE
CERTIFICATE OF CORRECTION

| | | |
|---|---|---|
| PATENT NO. | : 6,880,600 B1 | |
| APPLICATION NO. | : 09/630915 | |
| DATED | : April 19, 2005 | |
| INVENTOR(S) | : Bernard Bidet | |

It is certified that error appears in the above-identified patent and that said Letters Patent is hereby corrected as shown below:

<u>COLUMN 8</u>:

Line 35, "190" should read --125--.

Signed and Sealed this

Eleventh Day of September, 2007

JON W. DUDAS
*Director of the United States Patent and Trademark Office*